April 6, 1948.  C. E. WILKES  2,439,155

IGNITION LOCK

Filed Sept. 13, 1946

INVENTOR.
Claude E Wilkes
BY
*Henry L. Jennings*
ATTORNEY

Patented Apr. 6, 1948

2,439,155

UNITED STATES PATENT OFFICE 2,439,155

IGNITION LOCK

Claude E. Wilkes, Birmingham, Ala.

Application September 13, 1946, Serial No. 696,744

11 Claims. (Cl. 70—237)

My present invention relates to an improved ignition lock for automobiles and has for an object the provision of a system embodying means whereby the ignition may be positively locked when desired, thus to secure the automobile against theft.

A further object of my invention is to provide an improved locking mechanism for an automobile ignition system which embodies as its primary security means a combination lock having the fence thereof operatively connected to a separable shaft forming a part of the timing mechanism, and so arranged and constructed that the manipulation of a pair of dials on the instrument panel of the automobile serves to lock and unlock the ignition system.

A more specific object of my invention is to provide a lock for an automobile ignition system embodying a tumbler type lock having means associated with the fence thereof to lock the ignition whenever the fence is withdrawn from the tumblers.

A further object is to provide a lock of the character described which is entirely inclosed within a tamper-proof casing, the latter being so affixed to the engine of the automobile that it is necessary to remove major portions of the engine in order to enter the casing.

A still further object is to provide a lock of the character described in which the fence is withdrawn from the tumblers through the medium of a resilient connection movable upon rotation of a shaft, in combination with means on said shaft for positively unlocking the separable sections of the timing mechanism shaft.

Apparatus embodying features of my invention is illustrated in the accompanying drawings forming a part of this application in which.

Figure 1:
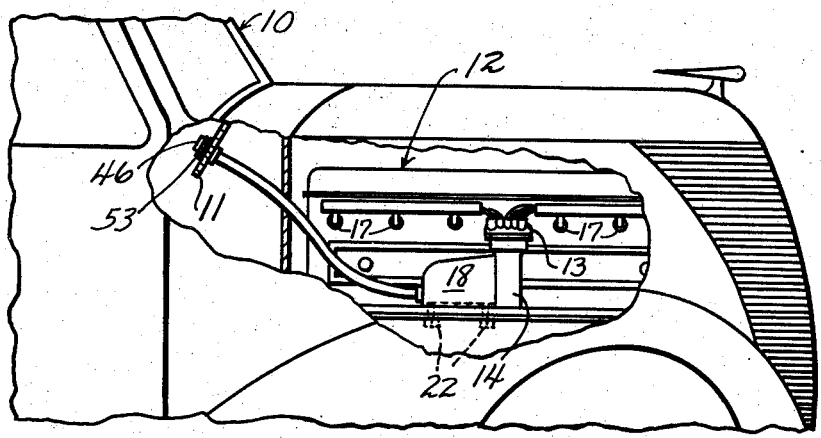
Fig. 1 is a fragmentary view partly in section of the front end of an automobile showing my improved locking mechanism in place.

Referring now to the drawings for a better understanding of my invention, I show in Fig. 1 a portion of an automobile having the usual body 10, instrument panel 11, and internal combustion engine 12. The engine 12 is equipped with the usual ignition system, comprising a distributor 13 which may be mounted on a pedestal housing 14. The system also embodies a rotor 16, which serves to energize spark plugs 17 at the proper time in the cycle of operation of the engine, in the well known manner. Positioned adjacent the pedestal 14 is a housing or casing 18 forming an inclosure for the locking devices of my improved lock. The casing is open at the bottom as shown at 19, and is secured to the engine by means of studs 21, which preferably project downwardly into an inner portion of the engine to receive nuts 22. It will be apparent therefore that to remove the casing 18, it is first necessary to remove the nuts 22 and that the nuts are accessible only from inside the engine.

Figure 2:
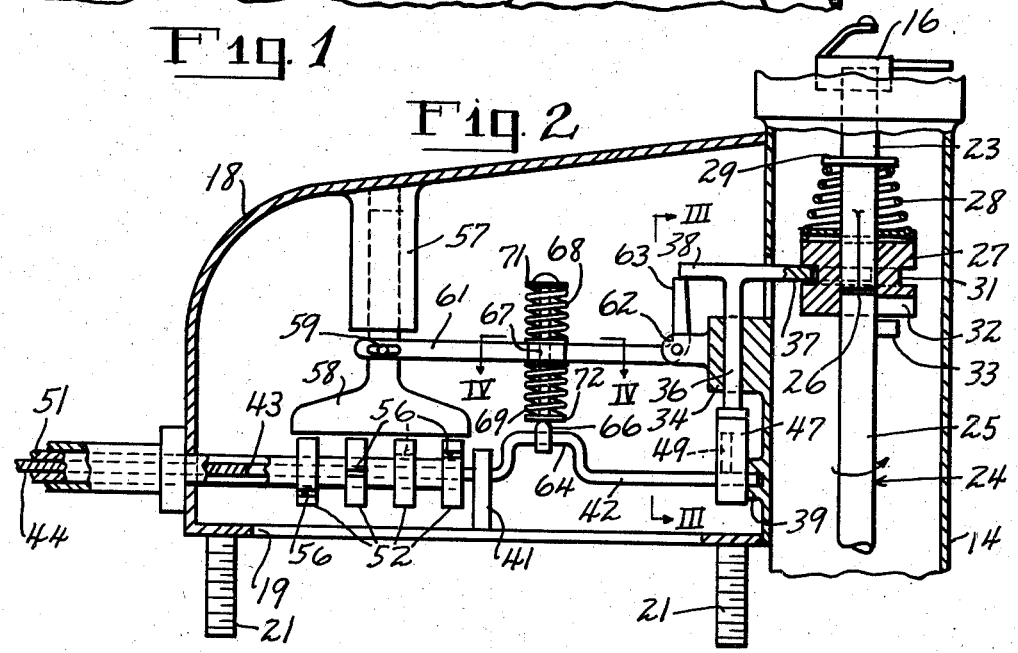
Fig. 2 is an enlarged sectional view through a portion of the locking mechanism and illustrating the same in locked position.

Referring more particularly to Fig. 2 of the drawing, within the pedestal 14 is mounted the upper section 23 of a rotor drive shaft 24, the lower section 25 of which is driven from the engine in a manner well understood and not shown. The upper end 23 of the shaft is separate from the lower end 24, as indicated at 26.

Slidably mounted over the shaft sections at the point of separation is a coupling 27, which is biased downwardly toward coupled position by means of a spring 28. The upper end of the spring rests against a washer 29 fast on the shaft section 23. The coupling is provided with an annular groove 31 in the side thereof, and a slot 32 in the bottom. The lower section 24 of the shaft carries a pin 33 adapted, when the coupling 27 is in its lowermost position, to engage within the slot 32, thereby locking the upper section of the shaft to the lower section.

Slidably mounted in suitable bearings 34 is an actuating bar 36 having a fork 37 on one side thereof adapted to fit within the groove 31 of the coupling 27. Projecting oppositely from the yoke 37 at the top of the bar 36, is a lug 38, the function of which will be later described.

Figure 3:
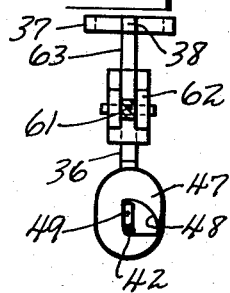
Fig. 3 is a detailed sectional view taken along line III—III of Fig. 2.
Figure 4:
Fig. 4 is an enlarged detailed sectional view taken along line IV—IV of Fig. 2.
Figure 5:
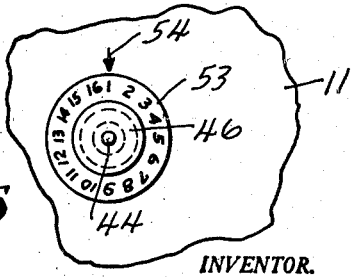
Fig. 5 is a fragmentary view of a portion of the automobile instrument panel showing the controls for my improved lock installed thereon.

Rotatably mounted in suitable bearings 39 and 41 is a shaft 42, connected as at 43 to a flexible drive shaft 44 extending from the housing 18 to the instrument panel 11. The shaft 42 is rotated through the flexible shaft 44 by means of a dial 46 on the instrument panel. Adjacent one end, the shaft 42 has mounted thereon a cam 47 provided with a recess 48 in one side thereof. As best shown in Fig. 3, the recess is substantially ¼ of the arc of a circle in circumference, and fitting within the recess 48 is a small pin 49 fast on the shaft 42. It will be apparent therefore that the shaft 42 may be turned approximately ¼ round before the cam commences to rotate.

The lower end of the actuating bar 36 rests slidably against the face of the cam 47 so that when the cam is rotated the yoke 37 is moved vertically thus moving the coupling 27 to uncoupled position with respect to the shaft sections 23 and 24.

A second flexible shaft 51 surrounds the shaft 44 and extends from the instrument panel 11 to the casing 18 where it is connected to the drive end of a set of tumblers 52, forming a part of the usual type of tumbler lock. At its upper end, the shaft 51 is provided with a numbered dial 53 by means of which the tumblers may be turned to the correct unlocking position for which the lock is set. A datum line 54 is stamped in suitable manner on the dash board 11 and serves as a reference point in dialing the correct combination. Each of the tumblers is provided with the usual slots 56, which come into alignment when the proper combination is dialed by actuation of the dial 53, in the manner well understood in the operation of tumbler locks.

Slidably mounted for vertical movement in a suitable bearing 57, is the fence 58 of the tumbler lock, adapted, when the slots 56 are in alignment, to enter thereinto. Pivotally mounted as at 59 to the fence is one end of a rock bar 61. The rock bar is pivoted adjacent its other end to a suitable bracket 62, and is provided with an upturned end 63, adapted upon withdrawal of the fence, to engage beneath the lug 38 of the bar 36, thus to hold the coupling 27 in uncoupled position.

The means for withdrawing the fence from the tumblers comprises a crank portion 64 formed on the shaft 42, to which is connected the lower end of a pin 66. The pin 66 passes loosely through a collar 67 carried by the rock bar 61, and is connected to the rock bar by means of upper and lower springs 68 and 69. The springs are held about the pin by means of washers 71 and 72 carried thereby.

From the foregoing, the operation of my improved ignition lock will be readily understood. With the fence 58 engaged within the slot 56 of the tumblers 52, the first step in locking the system is to rotate the dial 46. This action lifts the actuating bar 36 vertically raising the coupling 27, and separates the upper driven portion 23 of the shaft from the lower driving portion 24. At the same time, the fence 58 is withdrawn from the slots 56 in the tumblers, and the end 63 of the rock bar is positioned beneath the lug 38 carried by the actuating bar 36. The dial 53 is now rotated sufficiently to bring the slots 56 out of alignment whereupon it will be apparent that the fence cannot move downwardly. The system is thus effectively locked with the rotor 14 in stationary position regardless of the rotation of the driving section 24 of the shaft. When it is desired to unlock the system, the correct combination is dialed by means of the dial 53, thus bringing the slots 56 back into alignment. With the slots aligned, the fence 58 slides downwardly thereinto responsive to compression of the upper spring 68 by rotating shaft 44, and the end 63 is pivoted from its locking position beneath lug 38. As the dial 46 continues to rotate past a quarter turn, cam 47 is rotated, causing the actuating bar 36 to move downwardly, thus bringing the coupling 27 into locking position.

It is to be noted that upon rotation of the dial 46, the lost motion between the shaft 42 and cam 47 permits the springs 68 or 69 to be compressed upon rotation of the shaft before the cam commences to rotate. It is also to be noted that the fence withdrawal mechanism and the actuating mechanism for moving the coupling 27 are all movable by rotation of shaft 42. This construction obviates the necessity of having separate drives for accomplishing these two movements. Likewise, the resilient connection afforded by the springs 68 and 69 serves both to prevent damage to the parts and makes possible the use of a common shaft for actuating the fence and coupling.

From the foregoing it will be apparent that I have devised an improved ignition lock which is simple of operation and construction and which, in association with the casing secured to the automobile engine as disclosed herein, forms a very secure lock for protecting an automobile against theft.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In an ignition system embodying a drive shaft for the timing mechanism, and means to disengage the timing mechanism therefrom, a tumbler lock embodying a fence, means operable upon withdrawal of the fence to lock the timing mechanism in disengaged position, and means to withdraw the fence from the tumblers.

2. In an ignition system embodying a drive shaft for the timing mechanism, and means to disengage the timing mechanism therefrom, a tumbler lock embodying a fence, means operable upon withdrawal of the fence from the tumblers to lock the timing mechanism in disengaged position, a tamper-proof casing surrounding the tumbler lock and timing mechanism locking means, and means to withdraw the fence from the tumblers.

3. In an ignition system embodying a separable drive shaft for the timing mechanism, coupling means associated with the separable shaft sections, a tumbler lock embodying a fence, means associated with the fence of the lock for locking said coupling means in inoperative position, when the fence is withdrawn from the tumblers, and means to withdraw the fence.

4. In an ignition system embodying a separable drive shaft for the timing mechanism and a slidable coupling associated with the separable shaft sections, a tumbler lock embodying a fence, means to slide the coupling to inoperative position, means associated with the fence for holding the coupling in inoperative position when the fence is withdrawn from the tumblers, means to withdraw the fence, and drive means for rotating the tumblers.

5. In an ignition system embodying a drive shaft and a coupling to disengage the timing mechanism from the shaft, a tumbler lock embodying a fence, a rotatable shaft, means on the shaft for moving the coupling to disengaged position, means to withdraw the fence from the tumblers, a detent movable responsive to withdrawal of the fence to lock the coupling in disengaged position, means to rotate the tumblers, and a tamper-proof casing surrounding the tumbler lock and detent.

6. In an ignition system embodying a separable drive shaft for the timing mechanism, a coupling associated with the separable shaft sections, means to slide the coupling from coupled to uncoupled position, a tumbler lock embodying a fence, means associated with the coupling sliding means for withdrawing the fence from the tumblers, means operable upon withdrawal of the fence to lock the coupling in uncoupled position, and means to rotate the tumblers to locked position with respect to the fence.

7. In an ignition system embodying a separable drive shaft for the timing mechanism, coupling means associated with the separable shaft sections, a tumbler lock embodying a fence, means to move the coupling to inoperative position, means associated with the fence for locking said coupling means in inoperative position upon withdrawal of the fence from the tumblers, means to withdraw the fence, and a tamper-proof casing surrounding the lock and coupling moving and locking means.

8. In an ignition system embodying a separable drive shaft for the timing mechanism, and a coupling slidable on the separable shaft sections to couple and uncouple the same, positively actuatable means for sliding the coupling to uncoupled position, a tumbler lock embodying a fence, resilient means adapted to withdraw the fence from the tumblers, means for locking the coupling in uncoupled position upon withdrawal of the fence, a shaft common to the coupling sliding and fence withdrawal means for actuating the same, and means to rotate said shaft.

9. In an automobile ignition system embodying a separable drive shaft for the timing mechanism, and a coupling slidable on the separable shaft sections to couple and uncouple the same, a tumbler lock embodying a fence, a rotatable shaft on which the tumblers are mounted, a cam on the shaft, a delayed motion connection between the cam and shaft whereby the latter rotates a predetermined distance before the former commences to rotate, means responsive to rotation of the cam to slide the coupling to uncoupled position, a pivoted arm having an end connected to the fence, a resilient connection between the shaft and said arm adapted upon rotation of the shaft to withdraw the fence from the tumblers, a detent on the other end of said arm adapted upon withdrawal of the tumblers to secure the coupling in uncoupled position, a tamper-proof casing surrounding the tumbler lock cam and detent, and means operable externally of the casing for rotating said shaft and tumblers.

10. Apparatus as defined in claim 9 in which the means for rotating the shaft and tumblers comprises a pair of operating dials positioned on the instrument panel of the automobile.

11. Apparatus as defined in claim 9 in which the tamper-proof casing is secured to the engine of the automobile by fastening means accessible only from within the engine.

CLAUDE E. WILKES.

REFERENCES CITED

The following references are of record in the file of this patent:

UNITED STATES PATENTS

| Number | Name | Date |
|---|---|---|
| 1,105,296 | Obert | July 28, 1914 |
| 1,746,214 | Davidson et al. | Feb. 4, 1930 |